(12) United States Patent
Kelley et al.

(10) Patent No.: US 8,405,603 B2
(45) Date of Patent: Mar. 26, 2013

(54) SERVICE PROCESSOR FOR CONTROLLING A USER INTERFACE

(75) Inventors: Robert Kelley, Portland, OR (US); Richard Pocklington, San Francisco, CA (US); Jonathan Betts-LaCroix, San Mateo, CA (US)

(73) Assignee: Google Inc., Mountain View, CA (US)

( * ) Notice: Subject to any disclaimer, the term of this patent is extended or adjusted under 35 U.S.C. 154(b) by 1931 days.

(21) Appl. No.: 11/580,235

(22) Filed: Oct. 12, 2006

(65) Prior Publication Data

US 2007/0124509 A1  May 31, 2007

Related U.S. Application Data

(60) Provisional application No. 60/727,053, filed on Oct. 14, 2005.

(51) Int. Cl.
*G09G 5/00* (2006.01)
(52) U.S. Cl. .......................... 345/156; 709/248; 713/375
(58) Field of Classification Search ........... 345/1.1–111, 345/156–184; 712/31; 709/248; 713/375
See application file for complete search history.

(56) References Cited

U.S. PATENT DOCUMENTS

| | | | |
|---|---|---|---|
| 5,842,164 A * | 11/1998 | Fine | 704/244 |
| 6,704,022 B1 * | 3/2004 | Aleksic | 345/555 |
| 6,881,147 B2 * | 4/2005 | Naghi et al. | 463/35 |
| 7,408,582 B2 * | 8/2008 | Prabhu et al. | 348/333.05 |
| 2002/0044149 A1 * | 4/2002 | McCarthy et al. | 345/581 |
| 2002/0091869 A1 * | 7/2002 | Jones et al. | 709/310 |
| 2002/0169790 A1 * | 11/2002 | Lee | 707/104.1 |
| 2004/0100447 A1 * | 5/2004 | Ozolins | 345/170 |
| 2004/0116140 A1 * | 6/2004 | Babbar et al. | 455/517 |
| 2004/0222977 A1 * | 11/2004 | Bear et al. | 345/184 |
| 2004/0260858 A1 * | 12/2004 | Primrose | 710/316 |
| 2005/0091436 A1 * | 4/2005 | Huang | 710/313 |
| 2005/0174364 A1 * | 8/2005 | Malmstrom | 345/698 |
| 2005/0235215 A1 * | 10/2005 | Dunn et al. | 715/740 |
| 2006/0197860 A1 * | 9/2006 | Kim et al. | 348/333.1 |

* cited by examiner

*Primary Examiner* — Amare Mengistu
*Assistant Examiner* — Vinh Lam
(74) *Attorney, Agent, or Firm* — Morris & Kamlay LLP

(57) ABSTRACT

A computing device that includes a host processor and a service processor is provided. The host processor is configured to interact with a first user interface. For example, the host processor may be a microprocessor for the device and the first user interface may be a display device. A service processor is provided and can interact with a second user interface. In some cases, the service processor may interact with the second user interface without communicating with the host processor. Accordingly, the service processor can perform functions without relying on the host processor. Using the service processor conserves processing power and also may allow the reduction in size of the device as the service processor may perform the functions previously performed by discrete hardware and the host processor.

30 Claims, 5 Drawing Sheets

SERVICE PROCESSOR FOR CONTROLLING A USER INTERFACE

CROSS REFERENCES TO RELATED APPLICATIONS

This application claims priority from commonly assigned provisional patent application entitled "VISUAL, AUDIO AND TACTILE USER INTERFACE TO A PORTABLE PC SERVICE PROCESSOR", application No. 60/727,053, filed Oct. 14, 2005 the entire disclosure of which is herein incorporated by reference.

BACKGROUND

Embodiments of the present invention generally relate to computing.

User interfaces are typically provided to communicate with a user. The user interface is controlled by a host processor of the device that runs an operating system (OS). The user interface is used to provide an interface between the user and microprocessor. For example, the user may want to interact with the host processor to have some functions performed. Also, a microprocessor may want to send signals to the user interface to communicate with the user. Any communication with the user interface has to go through the host processor. By always having to communicate with the host processor, valuable processing power is used. This may take away from other tasks that the host processor may be performing. Also, there are times when the host processor may not be available. For example, the host processor may be off to conserve power, not available during error states, or in an inactive state. Thus, a user cannot interact with the host processor during this time and the host processor cannot send signals to relay information to the user through the user interface.

SUMMARY

Particular embodiments generally relate to a computing device that includes a host processor and a service processor. The host processor is configured to interact with a first user interface. For example, the host processor may be a microprocessor for the device and the first user interface may be a display device. A service processor is provided and can interact with a second user interface. In some cases, the service processor may interact with the second user interface without communicating with the host processor. Accordingly, the service processor can perform functions without relying on the host processor. Using the service processor conserves processing power and also may allow the reduction in size of the device as the service processor may perform the functions previously performed by discrete hardware and the host processor.

In one embodiment, an apparatus is provided comprising: a first user interface; a host processor configured to send a host processor signals to the first user interface; a second user interface; and a service processor configured to send a service processor signals to the second interface, wherein the service processor may sends the service processor a signal to the second interface without communicating with the host processor.

In another embodiment, a method for controlling a user interface is provided. The method comprises: determining a function to perform for the user interface at a service processor separate from a host processor; and sending a signal to a user interface element to cause performance of the function, wherein a host processor is not contacted to cause performance of the function.

A further understanding of the nature and the advantages of particular embodiments disclosed herein may be realized by reference of the remaining portions of the specification and the attached drawings.

DETAILED DESCRIPTION OF EMBODIMENTS

Figure 1:
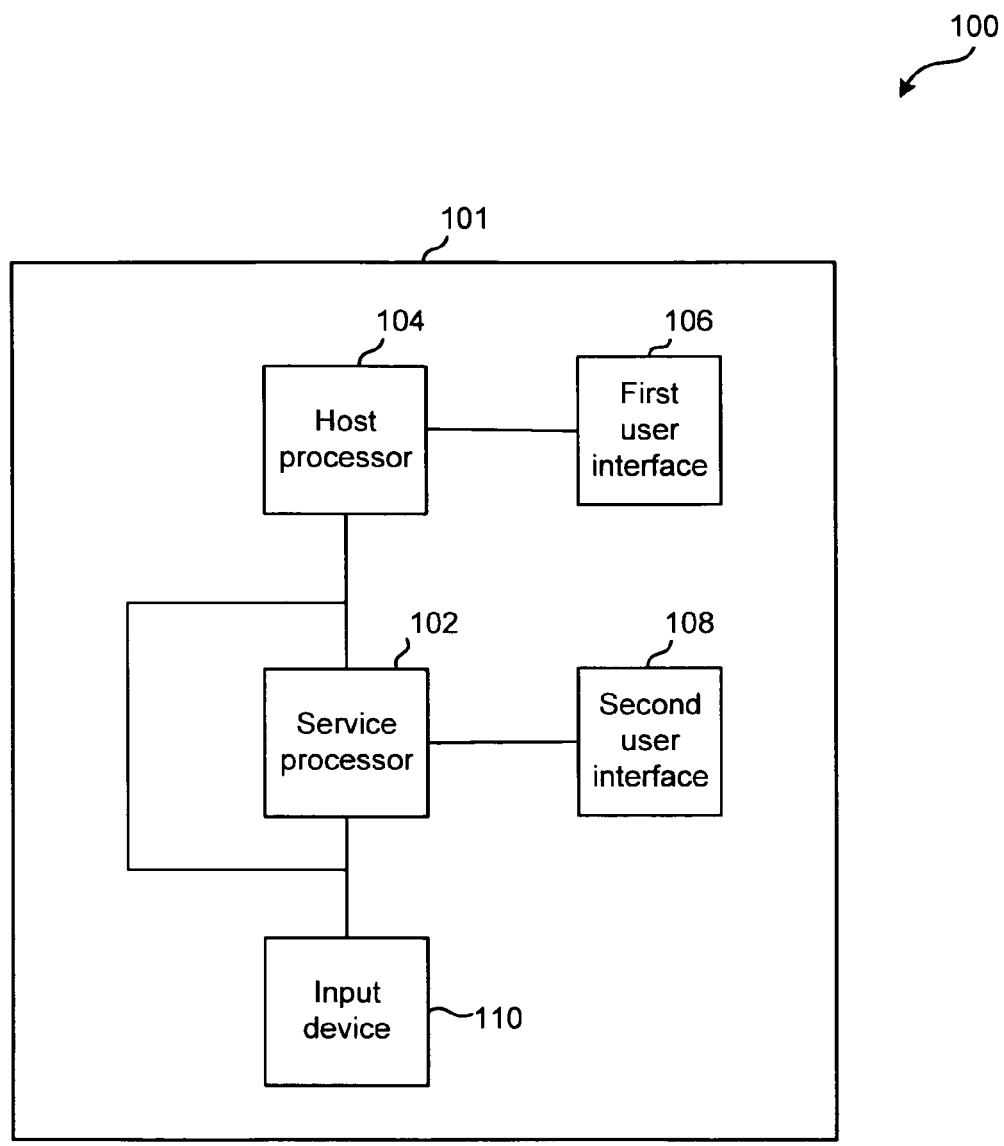
FIG. 1 shows an example of a system according to one embodiment of the present invention.

FIG. 1 shows an example of a system 100 according to one embodiment of the present invention. As shown, a device 101 includes a service processor 102 and host processor 104. Also, a first user interface 106, a second interface 108, and an input device 110 are provided. Although these entities are shown as being part of device 101, it will be understood that any of these entities may be part of other devices, detachable from device 101, etc. For example, system 100 may include modules that may be coupled together to form a computing system.

Device 101 may be any computing device, such as a portable computer, laptop computer, personal digital assistant (PDA), cellular phone, pocket PC, etc. An embodiment of device 101 will be described below. As devices 101 become smaller, placing functions that may have normally been performed by host processor 104 and transferring them to service processor 102 allow a reduction in architecture; thus allowing a reduction in size of device 101. For example, a substantial portion of basic functions previously performed using host processor 104 and hardware may be performed by service processor 102. Host processor 104 may still be used to operate the operating system of device 101. However, certain features may be offloaded to service processor 102. This reduces processing load on host processor 104 and also allows some features to be performed while host processor 104 is inactive.

In one embodiment, service processor 102 may use much less power than host processor 104. In one example, service processor 102 uses a 60 mA@4.2 B and host processor 104 uses 2 A@4.2 B. This reduction in power also saves battery life as features performed by service processor 102 may use less power.

In one embodiment, service processor 102 may be an embedded controller, such as an acorn RISC machine (ARM). Use of service processor 102 to perform features allows the functions usually performed by a large number of board components in hardware to be performed in firmware in service processor 102. This allows a substantial reduction of the size of device 101 as functions are performed in firmware using service processor 102 rather than having distinct hardware in device 101 to perform these functions.

First user interface 106 and second user interface 108 are used to provide information to a user. First user interface 106 may be a display device, such as a computer monitor, television, liquid crystal display (LCD), speakers emitting audio, and/or any other device that can convey information to a user.

Second user interface 108 may be any device that can be used to provide information to a user. In one embodiment, second user interface 108 may be any number of light emitting diodes (LEDs). However, second user interface 108 may also be any of the devices listed above for first user interface 106.

First user interface 106 and second user interface 108 may be connected to service processor 102 and host processor 104 in a number of different manners. Their connections may include the use of a bus or a wireless protocol or any other manner in which signals are sent from a processor to a user interface device. This transmission may involve any number of intermediate steps, such as transmission through a network.

Host processor 104 communicates with first user interface 106 to provide information to the user. Service processor 102 communicates with second user interface 108 to provide information to a user. In one embodiment, the communication between service processor 102 and second user interface 108 may be without communicating with host processor 104. There may be circumstances where host processor 104 is inactive or reduced in activity (e.g., in standby mode), but service processor 102 may be active. For example, host processor 104 may be inactive early in a boot-up cycle, during error states, and/or during times when conservation of power is necessary. However, because service processor 102 is based in firmware, service processor 102 may be active. In firmware, the operating system does not need to be fully booted up for service processor 102 to provide certain features. Thus, functionality may be provided by service processor 102 at times it may not have previously been available.

Service processor 102 may be directly in control of second user interface 108. Accordingly, service processor 102 may communicate information to a user through second user interface 108 without the need of host processor 104.

Second interface 108 and service processor 102 allow different functions to be provided. Service processor 102 may use second user interface 108 to relay various messages. In one example, the messages may include the status of an operating system, the status of a dock unit, the status of connected appliances, the status and condition of power supplies, battery packs and other power systems, or the status of any other systems managed by service processor 102. Other messages will also be appreciated.

Systems managed by service processor 102 may include any number of peripheral or integral devices that may interact with host processor 104. Such systems include wireless telephones, PDA's, cameras, or automobiles.

In one embodiment, as will be described in more detail below, LEDs may be used to relay messages to a user. In one embodiment, four LEDs are used. These lights may be in one of three states—on, off, and pulsing. In this way, service processor 102 can transmit 81 discrete states to the user. These states may vary over time such that a language using 81 discrete characters can be generated.

In one embodiment, user interface 108 may be provided an input device 110. Input device 110 may be any input device. For example, input device 110 may be a keyboard, porting device, etc. Further, input device 110 may receive voice commands, touchscreen commands, etc. In one embodiment, input device 110 may communicate with service processor 102 and/or host processor 104. This communication may request that certain features be performed.

In one embodiment, second user interface 108 may be included in a keyboard or a pointing device. In this case, the keyboard may be used to communicate information to the user. For example, LEDs may be included on a portion of the keyboard and are used to communicate different messages to the user.

Also, input device 110 may be any device that can provide input, not necessarily input by a user. For example, input device 110 may be other information that is determined from some action of a device, such as the movement of device (measured by an accelerometer) or any other cue that occurs, such as information detected in a video, information detected while the user is surfing the web, etc. Thus, input may be received from any device.

Upon receiving input, service processor 102 may perform some action. For example, a function may be requested using input device 110. Service processor 102 can then cause performance of the function. A result of the function may be communicated to the user through second user interface 108. In this case, certain functions may be performed without communicating with host processor 104. This maybe useful when host processor 104 is in an inactive state or unavailable. Further, offloading functions to be performed by service processor 102 allows less power to be used and also allows for the reduction in size of device 101. In one example, a keyboard may be controlled by service processor 102. Accordingly, a desired function may be inputted on the keyboard and communicated to service processor 102. The desired function may then be performed by service processor 102 without the intervention of host processor 104.

Figure 2:
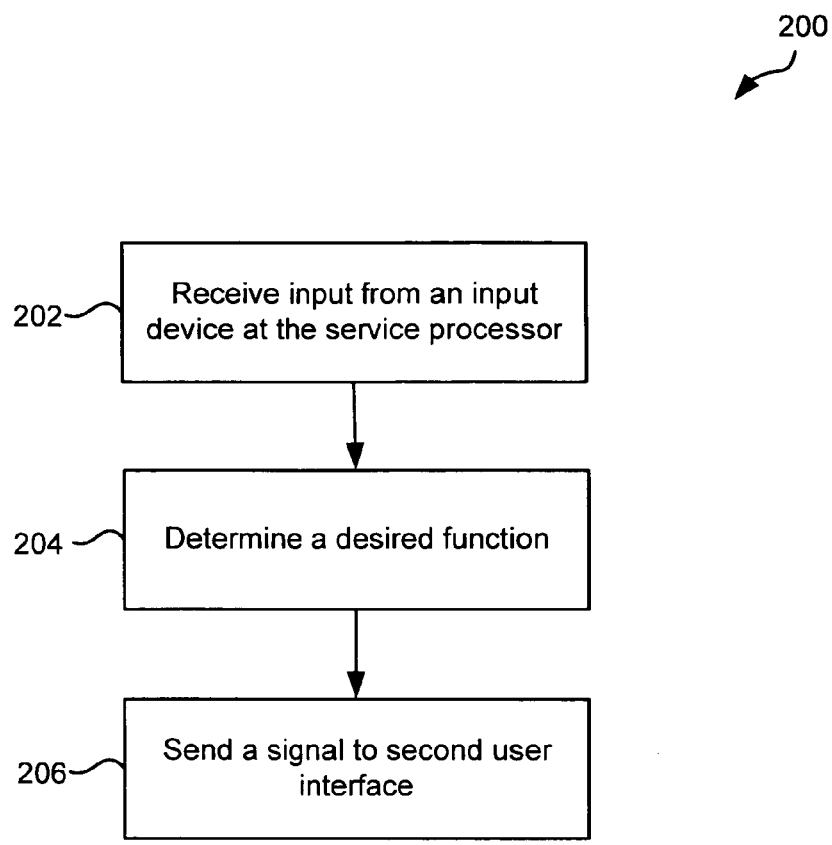
FIG. 2 depicts a simplified flowchart of a method for controlling service processor 102 according to one embodiment of the present invention.

FIG. 2 depicts a simplified flowchart 200 of a method for controlling service processor 102 according to one embodiment of the present invention. Step 202 receives input from input device 110 at service processor 102. The inputs may be received from any input device 110, such as a keyboard, pointer device, etc. Further, service processor 102 may detect certain events that occur, such as when an accelerometer detects certain movement, a signal is received at service processor 102, etc. In other examples, a pointing device may be used to directly interact with service processor 102. Further, a function key may be used to send input to service processor 102.

In step 204, service processor 102 determines a desired function. For example, different functions may include the movement of a pointing device, performance of a function based on a key stroke, the operation of certain devices controllable by service processor 102, etc. Examples of operations that can be performed by service processor 102 are listed in table I.

TABLE I

Feature:

A reference clock
Voltage meters
A photo sensor
Temperature measurements
Measure battery charge, voltage, current and communicate values to OS
Control and measure fan speed
Control backlight
Control the keyboard and keyboard light-emitting diodes (LEDs)
Control trackstick and mouse buttons
Control power button and power indicator LED
Control central processing unit (CPU) startup and shutdown sequence
Write basic input/output system (BIOS) flash during manufacturing
Implement EC loader for loading and upgrading EC firmware
Implement diagnostics in support of manufacturing test
Supply IEEE-1394 media access control (MAC) address TABLE I-continued Feature:

Communicate with the battery
Control transitions between soft off, running, sleeping, etc.
Cock identification
Control scroll wheel and scroll wheel button
Measure and control the battery, battery support chips, and LEDs
Watch POST output from the CPU during boot
Control real time clock
Control the mouse and keyboard interfaces
Cock control for splitbridge, trackstick, tablet, IEEE-1394, AC97 codec In step 206, service processor 102 sends a signal to second user interface 108. The signal may communicate that a function is being performed using second user interface 108. For example, the message may be the actual performing of the requested function. If it is desired that the pointer move, then second user interface 108 may show the pointer being moved across a screen. In another example, the message may be that the function was performed.

The steps shown in FIG. 2 are performed without intervention of host processor 104. Accordingly, the desired function may be performed without using host processor 104. Thus, input device 110 directly interacts with service processor 102.

Figure 3:
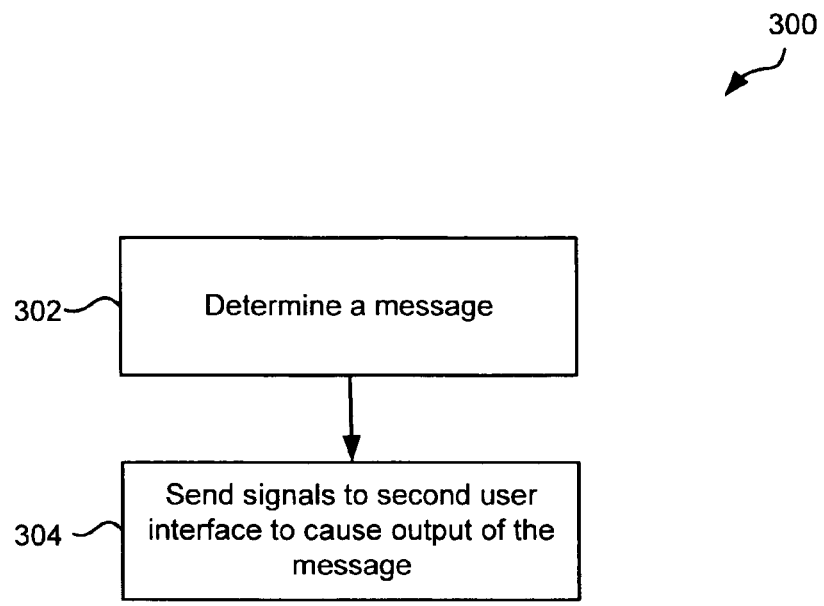
FIG. 3 depicts a simplified flowchart of a method for providing a message to a user according to one embodiment of the present invention.

Service processor 102 and second user interface 108 may also be used to send messages to a user without the intervention of host processor 104. FIG. 3 depicts a simplified flowchart 300 of a method for providing a message to a user according to one embodiment of the present invention. In step 302, service processor 102 determines a message. This may be any message that should be communicated to a user. For example, the status of first user interface 106, second user interface 108, host processor 104, service processor 102, or the systems supplying or managing power to any of the aforementioned components during a boot up may be communicated to a user.

In step 304, service processor 102 sends signals to second user interface 108 to cause output of the message. For example, if LEDs are used, second user interface 108 may display a pattern of LEDs being in a certain state, such as on, off, or pulsing, to relay the message to the user. Further, if second user interface 108 is a display, then a message may be displayed. This message may be sent to second user interface 108 without intervention of host processor 104. Accordingly, a message may be sent to a user while host processor 104 is inactive. This also may save battery life and processing power as certain messages may be sent to second user interface 108 by service processor 102 without using host processor 104, which may use more power than service processor 102.

Figure 4:
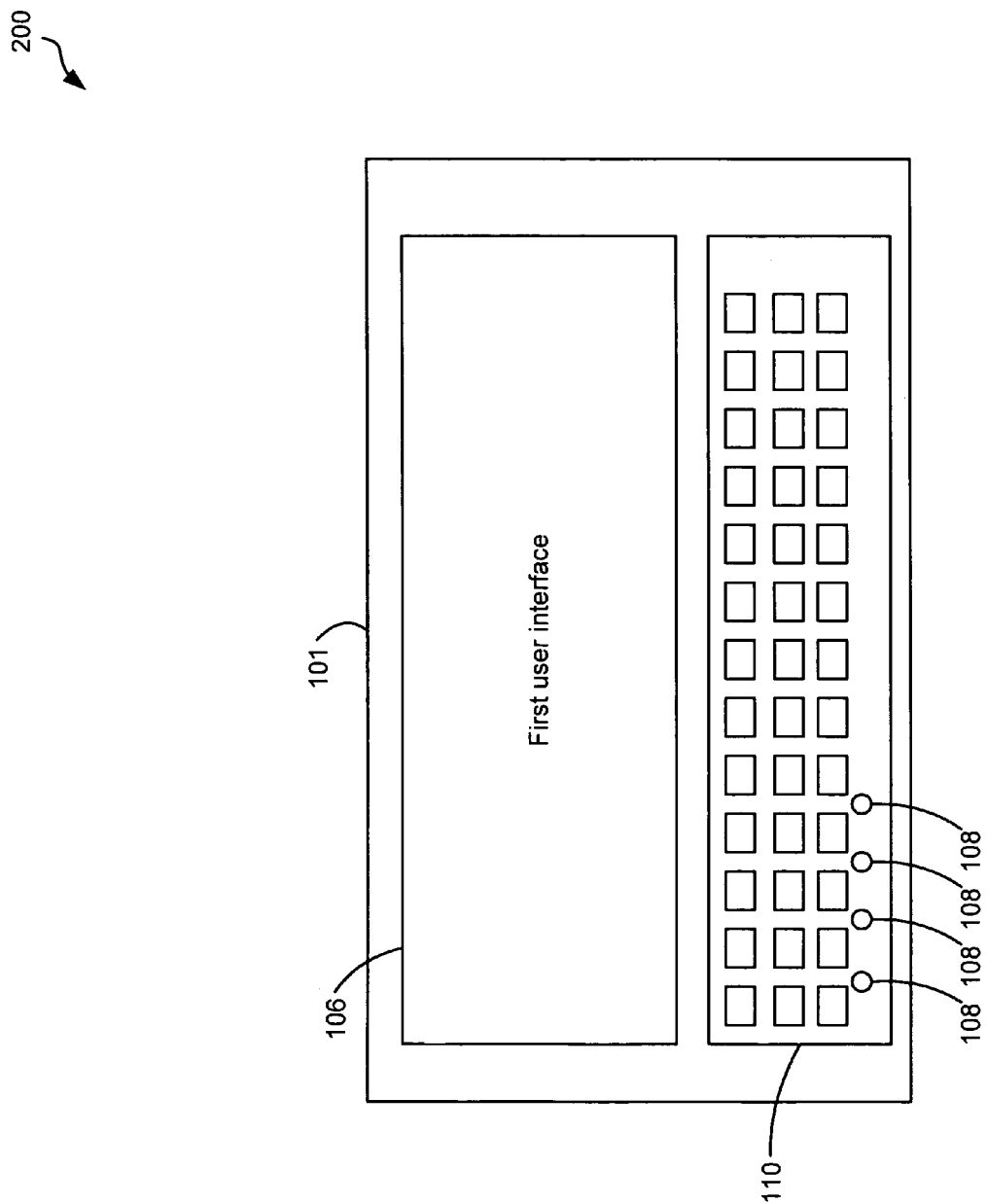
FIG. 4 depicts an example of a first user interface and a second user interface according to one embodiment of the present invention.

FIG. 4 depicts an example of first user interface 106 and second user interface 108 according to one embodiment of the present invention. As shown, device 101 includes first user interface 106, second user interface 108, and input device 110.

In this embodiment, first user interface 106 is a display screen, second user interface 108 includes four LEDs, and input device 110 is a keyboard. Although these are shown, it will be understood that variations may be provided. For example, different numbers of LEDs may be provided, different input devices may be used, etc. Further, it will be understood that devices other than LEDs may be used, such as lasers, lights, any other type of electromagnetic emitting system, etc. In one embodiment, any device that can relay three states may be used. Also, devices that can relay more than 3 states may also be used. In addition to the three states, the color and intensity of lights may be varied, the pattern or mode of flashing of intermittent lights can be varied, and any arrangement of the lights may be used to provide different messages to a user. In one example, the light LEDs may be placed in a way to perform a display.

In one embodiment, the LEDs may be positioned substantially in input device 110. For example, the LEDs may be on the keyboard beneath the shift, function, control, and alt keys. These LEDs deliver messages directly from service processor 102 to the user. In one example, service processor 102 may interact with first user interface 106 to display a message instead of second user interface 108.

Various messages may be constructed using the LEDs. Service processor 102 can display messages to the user through the set of colored LEDs. In other embodiments, a pattern of beeps or activation of other components of device 101 may be provided. Further, the LEDs may be used in addition to providing sound effects from a speaker.

In this example, the LEDs may be in one of three states: on, off, or pulsing. Thus, 81 discrete states may be transmitted to the user. These states may vary over time such that a language using 81 discrete characters can be generated. Table II includes an example of certain messages that may be provided.

TABLE II

SFCA (Shift, Fn, Ctl, Alt) state
0000 off
0001 shmoo, restart, or power button seen
0010 SUSB__&& SUSC__seen
0011 PWRGOOD__CPU seen
0100 PWRGOOD__CPU seen
0101 POWERGOOD asserted, doing POST
0110 initialize SIO
0111 initialize RTC
1000 initialize mouse interface
1001 initialize keyboard interface
1010 initialize power management 0
1011 initialize power management 1
1100 assert POWERGOOD on resume
1101 initialize I2C, PLL
1110 initialize accelerometer ADC
on resume
0010 WAIT__PWRGOOD__CPU__RESUME
0011 wait for power to be good
0100 WAIT__POWERGOOD__RESUME
0110 as above....
also
1100 PCI reset, FORCE__STARTUP__V__asserted
during EC load
bit 0 reading data
bit 1 crc error
bit 2 flash erase error
bit 3 flash write error The state of the four LEDs on input device 110 transmits information in such a way that a user can achieve a detailed understanding of a message being sent by service processor 102. This is well beyond the capability of devices that may include a single light]. For example, service processor 102 is an embedded controller that can perform a variety of processing features using firmware. This allows more intelligent messages to be composed and provided through the LEDs.

Given that four LED's are available each of which can enter 3 states (on, off, blinking) a total of 81 states can be generated. These 81 states may themselves be changed over time, providing the user with an 81 character language through which the service processor communicates to them through generating patterns of LED's. This information can be delivered in such a manner to provide the user a rich understanding of the internal states of the service processor 102 or the host processor 104.

In one embodiment, each of the LED's that make up second user interface 108 are associated with one of the keys in the keyboard of input device 110. In this particular embodiment, input device 110 is able to provide both the function of a standard input device, such as a keyboard, keypad, mouse, trackball, trackstick or joystick, but is also configured to act as second user interface 108. As this second user interface 108 is controlled by service processor 102 instead of host processor 104, second user interface 108 can operate in modes that deliver information to the user that enriches, aids, or expands his/her ability to make use of input device 110, which may interact with either service processor 102 or host processor 104.

Thus, in one embodiment, the interaction of the service processor 102 with the LED's of second user interface 108 and the keyboard of input device 110 creates a keyboard that may both send and receive information. The LED's, placed in association with the keys and controlled by service processor 102 can provide the user many different classes of information. This information can include the state of service processor 102, the state of host processor 104, or the state of applications running on either of these processors. The information can be provided in response to input generated by the user through input device 110 or user interface 108 at a very high rate, as both devices interact with service processor 102.

In one embodiment, as the user depresses keys on the keyboard, service processor 102 may illuminate LED's or other light emitting elements associated with certain other keys. Thus, the keyboard acts as both an input and an output device. This function is useful for many purposes including games that can be played on the keyboard without the use of first user interface 106 or in concert with activities performed on first user interface 106. This function is useful for many purposes including word processing applications where the service processor 102 may recommend certain key strokes to facilitate correct spelling or grammar. This function is also useful for other purposes including phone book applications where the service processor 102 may recommend certain key strokes to aid the user in finding the correct phone number, email address or other piece of information with the least number of key strokes. Also, any application may be used to provide the user with information regarding which keys on input device 110 to depress to meet their needs.

Second user interface 108 may also perform functions other than providing messages to a user. For example, through the use of a pattern of emission of electromagnetic radiation released through the LEDs, device 101 may be able to communicate with other machines. If another device can recognize a pattern of pulsing lights from the LEDs, a message may be relayed to another device. Accordingly, the keyboard and second user interface 108 may be used as an output device not only to the user but to other devices capable of receiving electromagnetic signals.

The LEDs may also deliver information about the state of service processor 102. For example, during boot-up, the lights may blink to show the user what state of the boot-up it is in. This may be before host processor 108 boots up the operating system. For example, the LEDs may indicate checkpoints for service processor 102 during the boot-up process. These checkpoints allow the user to directly observe the steps that service processor 102 takes while booting up device 101. These checkpoints may be useful for diagnostic purposes if device 101 fails during the boot process. For example, the pattern of lights shown on the keyboard is useful in diagnosing the failure during the boot process.

Second user interface 108 may communicate to the user through means that involve tactile communication through vibration, the delivery of electrical shocks or other user interface methods which interact with the user's skin.

Also, the LEDs are also useful in non-failure situations as they provide the user with useful feedback on the state of the boot-up process well before first user interface 106 is able to provide any such information. That is, before host processor 104 boots up the operating system and can display information on first user device 106, information may be displayed through second user interface 108. This is because service processor 102 operates using firmware and does not need to interact with host processor 104 or rely on the operating system being booted up to relay messages to second user interface 108.

Using the LEDs, keyboard 110 may be able to deliver information about the state of the keyboard itself. Although conventionally the state of the keys on the keyboard is known, such as a caps lock light, the LEDs are able to deliver more information than a simple binary on and off state. This is because service processor 102 is able to perform more complex computations and to compose messages rather than simple binary on and off states.

In one example, the state of keys on input device 110 may be relayed through second user interface 108. For example, the keys associated with the LEDs have three modes. These modes are independent of the action of the pattern of flashing lights delivered during start-up. However, this example shows how service processor 102 may provide advanced messages and communication to a user when interacting with input device 110. This also expands the messages that can be relayed to a user based on input from input device 110.

In the first mode, an LED associated with a key may be off. This indicates that the key has not been depressed and modifications to other key strokes (e.g. the shift, alt, control, or function effects of pressing a key) may not be delivered.

In another mode, an LED associated with a key is flashing. This indicates that a key (e.g., a key associated with the LED) has been depressed once and modifications to other keystrokes may be delivered until the next single key is pressed (although an exception of a depression of that particular key or other keys with modifier functions such as shift, control, alt, or function may exist. For example, if the shift key has been pressed once and a user presses an alpha/numeric key, such as the letter "a", then the letter will be capitalized as a letter "A". This is different from just holding down the shift key and having to press the letter "A". Using this mode the user does not have to hold down the shift key and press the letter "A". This may be useful on small keyboards, such as those found on cellular phones, PDAs, pocket PCs, Blackberry devices, etc. Users may have to use their thumbs to type on these keyboards and thus the simultaneously holding down of the shift key and pressing one of the buttons may be harder than just pressing the shift key once and then the "A" key.

In a third mode, an LED associated with a key is lit. This indicates that the key has been depressed twice and modifications to other keystrokes may be delivered to all keys pressed until the key with the indicator is pressed again or any other indication that the keystroke modification is not desired anymore is received. For example, if a shift key has been pressed twice, then any keys pressed after this may be capitalized until the shift key is pressed again. By using this system, the use of a caps lock key does not need to be provided. Accordingly, the caps lock key does not need to be included in input device 110. This saves space on a keyboard that may be valuable when device 101 is small. Further, this increases the functionality of a keyboard while saving space.

Thus, the use of a caps lock key, control lock, alt lock, and function lock are provided without the addition of more keys.

Figure 5:
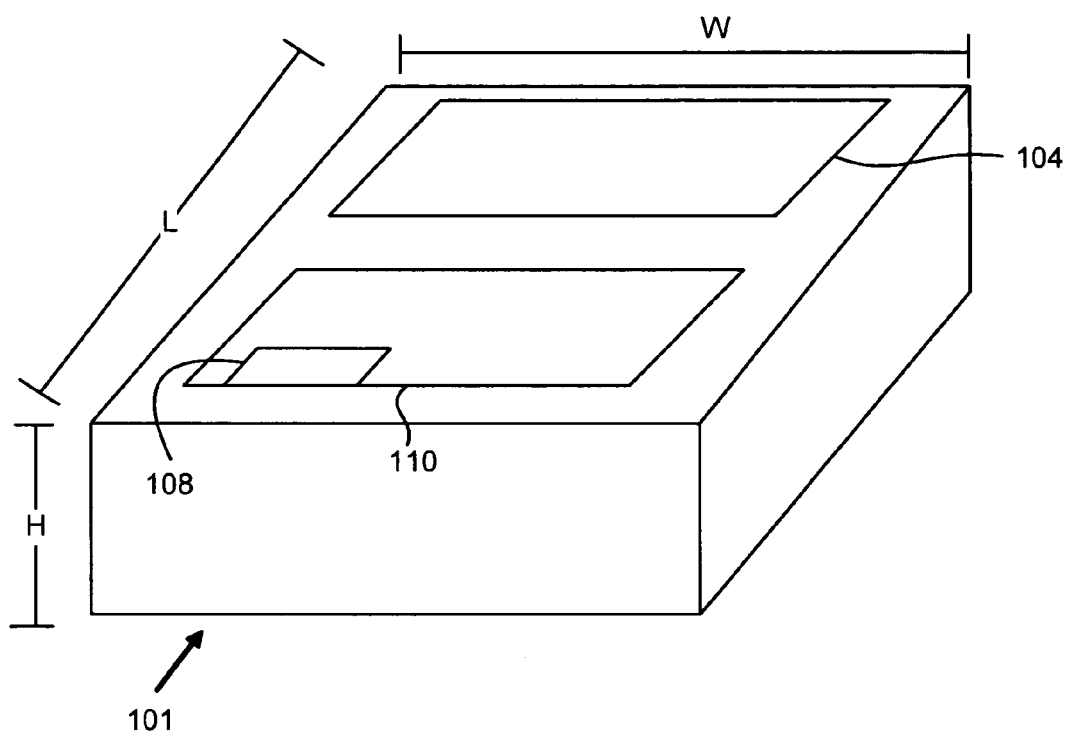
FIG. 5 shows an example device according to one embodiment of the present invention.

FIG. 5 shows an example device 101 according to one embodiment of the present invention. In one embodiment, device 101 may be a portable device. In one embodiment, the dimensions of device 500 may be a length, L, of substantially 4 inches; a width, W, of substantially 3 inches; and a height, H, of substantially ¾ inches. Additionally, the display may be a little under substantially 3 inches wide and substantially 4 inches long.

Input device 110 and second user interface 108 are also shown. Second user interface 108 may be substantially near/in input device 110. This makes it seem like input device 110 is being used as an interface to the user. Although this placement is provided, it will be understood that other layouts may be appreciated.

Although the description has been described with respect to particular embodiments thereof, these particular embodiments are merely illustrative, and not restrictive. Although a service processor is described, it will be understood that other processors may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus comprising:
    a first user interface;
    a host processor configured to send host processor signals to the first user interface; and
    a service processor that utilizes at most one tenth as much power as the host processor configured to:
        receive an input signal from an external input device;
        cause, without communicating with the host processor, an action to be performed based on the input signal received from the external input device; and
        send a service processor signal to a second interface without communicating with the host processor, where the service processor signal causes the second interface to provide information about the action.

2. The apparatus of claim 1, wherein the service processor signal causes a function to be performed without communication with the host processor.

3. The apparatus of claim 1, wherein the service processor signal causes information to be outputted on the second user interface.

4. The apparatus of claim 3, wherein the information comprises a pattern of lights, wherein one or more patterns can form one or more messages to a user.

5. The apparatus of claim 1, wherein the service processor sends the service processor signal to the second user interface when the host processor is not active.

6. The apparatus of claim 1, wherein the service processor signal controls a function of an item on the second user interface.

7. The apparatus of claim 1, wherein the second user interface is located in an input device.

8. The apparatus of claim 7, wherein the input device comprises a keyboard and the second user interface comprises a plurality of light emitting elements, wherein the plurality of light emitting elements allow messages to be generated to provide information to a user.

9. The apparatus of claim 8, wherein the plurality of light emitting elements are associated with a plurality of keys on the keyboard to provide information about a status of the plurality of keys, the status being one or three or more states.

10. The apparatus of claim 9, wherein the plurality of light emitting elements allow communication with a second device.

11. The apparatus of claim 1, wherein the second user interface is configured to send information to a device using the second user interface.

12. The apparatus of claim 1, wherein the second user interface is configured to display three or more messages based on the service processor signal.

13. The apparatus of claim 1, wherein the signal causes tactile communication to be provided through the second user interface.

14. A method comprising:
    receiving, by a service processor, an input signal from an external input device, where the service processor utilizes at most one tenth as much power as a host processor that is connected to a first interface;
    causing, without communicating with the host processor, an action to be performed based on the input signal received from the external input device and;
    sending a service processor signal to the second interface without communicating with the host processor, where the service processor signal causes the second interface to provide information about the action.

15. The method of claim 14, wherein performance of the action comprises providing a message to a user through the second user interface.

16. The method of claim 15, wherein the message comprises one or more patterns formed using a light emitting device.

17. The method of claim 14, wherein the input signal provides messages to provide information to a user through a plurality of light emitting elements on an input device.

18. The method of claim 17, wherein the plurality of light emitting elements are associated with a plurality of keys on the input device to provide information about a status of the plurality of keys, the status being one or three or more states.

19. The method of claim 18, wherein the plurality of light emitting elements allow communication with a second device.

20. The method of claim 14, wherein the input signal causes tactile communication to be provided through the second user interface.

21. The method of claim 14, further comprising receiving a signal from an input device, wherein the action to perform is determined based on the signal from the input device.

22. The method of claim 14, wherein the service processor causes performance of the action when the host processor is not active.

23. The method of claim 14, wherein the action controls an item on the user interface.

24. The method of claim 14, wherein the second user interface is configured to send information to a device using the second user interface.

25. The method of claim 14, wherein the second user interface is configured to display three or more messages based on the function to be performed.

26. The method of claim 14, wherein the host processor is configured to communicate with the second user interface.

27. The apparatus of claim 1, wherein the length of the apparatus is about 4 inches.

28. The apparatus of claim 1, wherein the width of the apparatus is about 3 inches.

29. The apparatus of claim 1, wherein the height of the apparatus is about 0.75 inches.

30. The method of claim 14, wherein the host processor is connected to a first user interface and the service processor.

* * * * *